United States Patent
Nagasaki

(10) Patent No.: US 12,503,166 B2
(45) Date of Patent: Dec. 23, 2025

(54) VEHICLE STRUCTURE FOR BATTERY PROTECTION

(71) Applicant: TOYOTA JIDOSHA KABUSHIKI KAISHA, Toyota (JP)

(72) Inventor: Yuta Nagasaki, Hamamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 391 days.

(21) Appl. No.: 18/143,878

(22) Filed: May 5, 2023

(65) Prior Publication Data

US 2023/0399052 A1 Dec. 14, 2023

(30) Foreign Application Priority Data

Jun. 14, 2022 (JP) ................................. 2022-096044

(51) Int. Cl.
*B62D 21/15* (2006.01)
*B60R 19/34* (2006.01)
*B60L 50/60* (2019.01)

(52) U.S. Cl.
CPC ............ *B62D 21/152* (2013.01); *B60R 19/34* (2013.01); *B60L 50/66* (2019.02)

(58) Field of Classification Search
CPC .............................. B62D 21/152; B60R 19/34
USPC ..................................................... 296/187.09
See application file for complete search history.

(56) References Cited

U.S. PATENT DOCUMENTS

| | | | |
|---|---|---|---|
| 2018/0015839 A1* | 1/2018 | Ito | B60L 50/64 |
| 2019/0061507 A1* | 2/2019 | Nitta | B60L 50/66 |
| 2019/0276080 A1* | 9/2019 | Otoguro | B60K 1/04 |
| 2021/0104717 A1* | 4/2021 | Matsushima | B60K 1/04 |
| 2021/0253171 A1* | 8/2021 | Yotsuyanagi | B62D 21/152 |
| 2021/0371011 A1* | 12/2021 | Itoh | B62D 25/2009 |

FOREIGN PATENT DOCUMENTS

| | | |
|---|---|---|
| JP | H09-272400 A | 10/1997 |
| JP | 2009-193942 A | 8/2009 |

\* cited by examiner

*Primary Examiner* — Taras P Bemko
(74) *Attorney, Agent, or Firm* — Dinsmore & Shohl LLP

(57) ABSTRACT

A vehicle includes a floor panel, a battery, a rocker, a torque box, and a front side member. The torque box extends inward in the vehicle width direction from a front end of the rocker along a front edge of the floor panel. The torque box includes a front wall and a rear wall that face each other in the vehicle length direction. The front wall and the rear wall define an internal space extending in the vehicle width direction. The front side member extends forward in the vehicle length direction from the torque box, and includes a proximal end portion at a rear end of the front side member. The proximal end portion is located in the internal space of the torque box, and is joined to an inner surface of the torque box in the internal space.

2 Claims, 3 Drawing Sheets

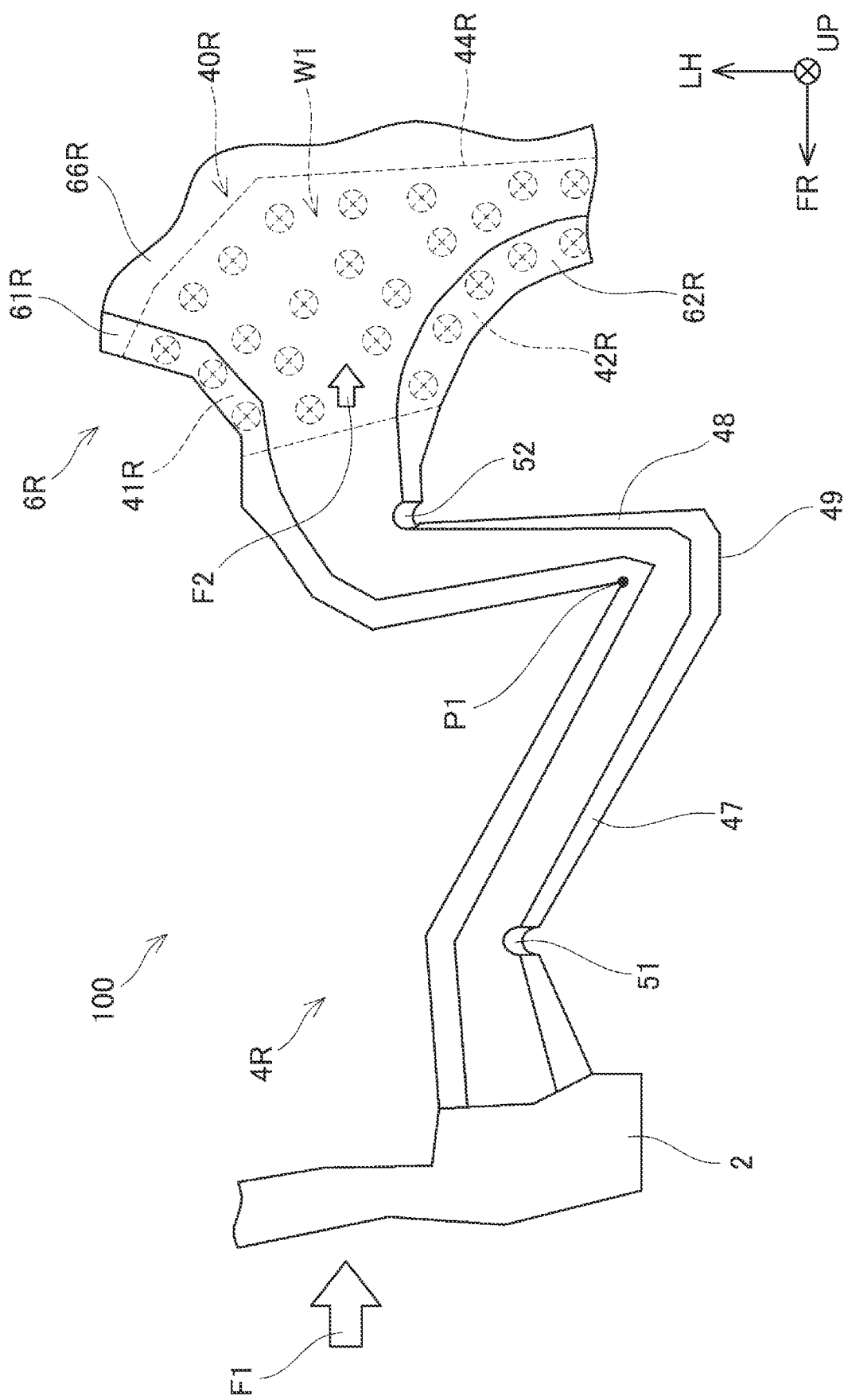

VEHICLE STRUCTURE FOR BATTERY PROTECTION

CROSS-REFERENCE TO RELATED APPLICATION

This application claims priority to Japanese Patent Application No. 2022-096044 filed on Jun. 14, 2022, incorporated herein by reference in its entirety.

BACKGROUND

1. Technical Field

The present disclosure relates to vehicles with a battery under a floor panel.

2. Description of Related Art

Japanese Unexamined Patent Application Publication No. 2009-193942 (JP 2009-193942 A) discloses a vehicle with batteries under a floor panel. This vehicle further includes: rockers extending in the vehicle length direction along side edges in the vehicle width direction of the floor panel; cross members extending inward in the vehicle width direction from the front ends of the rockers; and front side members extending forward from the cross members with extension side members interposed therebetween. The extension side member is a member that connects the front side member and the cross member to each other, and is bifurcated at the rear end of the front side member.

SUMMARY

In the vehicle of JP 2009-193942 A, the front side members are connected to the cross members by the extension side members extending in the vehicle length direction. Therefore, the space for the batteries is small in the vehicle length direction. The space for the batteries can be increased by using a configuration in which the extension side members are omitted and the front side members are directly connected to the cross members. However, if the strength at the connections is not enough, separation may occur at the connections when, for example, the vehicle is involved in a head-on collision. In this case, the front side members will not be deformed in an intended manner and cannot sufficiently absorb the collision energy. The present disclosure provides a technique for firmly connecting front side members to cross members without interposing any special members such as extension side members therebetween.

A vehicle according to an aspect of the present disclosure includes a floor panel, a battery, a rocker, a torque box, and a front side member. The battery is located under the floor panel. The rocker extends in a vehicle length direction along a side edge of the floor panel. The side edge is an edge of the floor panel in a vehicle width direction. The torque box extends inward in the vehicle width direction from a front end of the rocker along a front edge of the floor panel. The front edge is an edge of the floor panel in the vehicle length direction. The torque box includes a front wall and a rear wall that face each other in the vehicle length direction. The front wall and the rear wall define an internal space extending in the vehicle width direction. The front side member extends forward in the vehicle length direction from the torque box, and includes a proximal end portion at a rear end of the front side member. The proximal end portion is located in the internal space of the torque box, and is joined to an inner surface of the torque box in the internal space.

In the vehicle according to the aspect of the present disclosure, the proximal end portion of the front side member is joined to the inner surface of the torque box in the internal space of the torque box. According to the above configuration, the proximal end portion of the front side member can be firmly joined to the inner surface of the torque box. Since the front side member and the torque box are firmly connected to each other, separation will be less likely to occur at the connection between these members even when the vehicle is involved in a head-on collision. As a result, the front side member subjected to a collision load can be sufficiently deformed in an intended manner. Since the collision energy is thus sufficiently absorbed by the deformation of the front side member, damage to the battery, for example, can be avoided or reduced. Moreover, since there is no need to interpose a special member such as extension side member between the front side member and the torque box, the space for the battery, for example, can be increased in the vehicle length direction.

Details and further improvements of the technique of the present disclosure will be described in the section "DETAILED DESCRIPTION OF EMBODIMENTS" below.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 illustrates deformation of the right front side member in the event of a head-on collision.

DETAILED DESCRIPTION OF EMBODIMENTS

In one embodiment of the present technique, the front side member may have a groove at at least one position in the vehicle length direction, and the groove may extend in a vehicle height direction. According to such a configuration, the front side member can be sufficiently deformed in an intended manner at the groove in the event of a head-on collision.

In one embodiment of the present technique, the front side member may include a bend at at least one position in the vehicle length direction, and the bend may protrude outward in the vehicle width direction. According to such a configuration, the front side member can be sufficiently deformed in an intended manner at the bend in the event of a head-on collision.

In one embodiment of the present technique, the front side member may have grooves at at least a first position and a second position in the vehicle length direction, and the grooves may extend in the vehicle height direction. In this case, the first position may be located forward of the bend in the vehicle length direction, and the second position may be located rearward of the bend in the vehicle length direction. However, in another embodiment, both the first position and the second position may be located forward of the bend in the vehicle length direction, or may be located rearward of the bend in the vehicle length direction.

In one embodiment of the present technique, the proximal end portion of the front side member may have such a fillet shape as to widen in the vehicle width direction toward the rear end. In this case, the fillet shape may widen more in an outer portion in the vehicle width direction of the fillet shape than in an inner portion in the vehicle width direction of the fillet shape. According to this configuration, the outer portion in the vehicle width direction of the proximal end portion of the front side member is more firmly joined to the torque box than the inner portion in the vehicle width direction of the proximal end portion of the front side member. As a result, the front side member can be sufficiently deformed in an intended manner in the event of a head-on collision.

Embodiment

Figure 1:
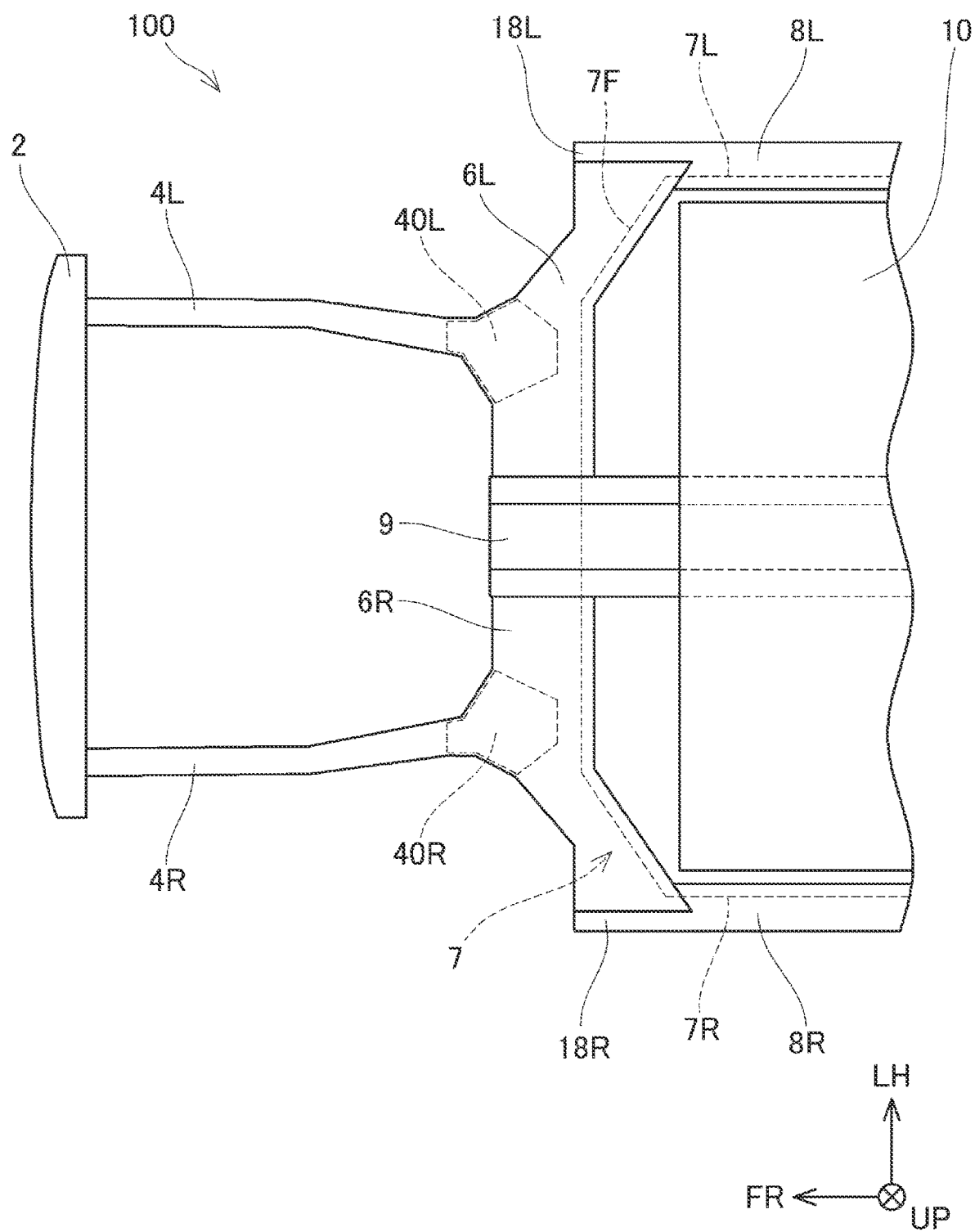
FIG. 1 is a bottom view of a vehicle according to an embodiment.

FIG. 1 is a bottom view of a front part of a vehicle 100 according to an embodiment. The vehicle 100 includes a bumper reinforcement 2, a pair of front side members 4R, 4L, a pair of torque boxes 6R, 6L, a floor panel 7, and a pair of rockers 8R, 8L. These are frame parts of the body of the vehicle 100. In the coordinate system shown in FIG. 1, "FR" indicates forward in the vehicle length direction. "UP" indicates upward in the vehicle height direction. "LH" indicates leftward when viewed forward from behind the vehicle 100, that is, leftward in the vehicle width direction. The meanings of the axes in the coordinate system are the same in the subsequent drawings as well. Hereinafter, "forward in the vehicle length direction" is sometimes simply referred to as "front" or "forward," and the opposite direction to "forward in the vehicle length direction" is sometimes simply referred to as "rear" or "rearward." Similarly, the "outer side in the vehicle width direction" is sometimes simply described as "outer" or "outer side," the opposite side to the "outer side in the vehicle width direction" is sometimes simply referred to as "inner" or "inner side," the "upper side in the vehicle height direction" is sometimes simply referred to as "upper" or "upward," and the opposite side to the "upper side in the vehicle height direction" is sometimes simply referred to as "lower" or "downward."

The vehicle 100 further includes a battery 10. The vehicle 100 is a battery electric vehicle, and is driven with the power of the battery 10. The battery 10 is a direct current (DC) power supply including a plurality of secondary battery cells. The battery 10 is a DC power supply that can be repeatedly charged and discharged. The type of the secondary battery cells is not particularly limited. The secondary battery cells may be, for example, lithium-ion battery cells or nickel metal hydride battery cells. The battery 10 is placed under the floor panel 7 (that is, on the side closer to the viewer of FIG. 1).

The floor panel 7 is a flat sheet metal part that forms the floor of the vehicle 100. The floor panel 7 extends in the vehicle length direction. A center tunnel 9 extends in the vehicle length direction (i.e., the horizontal direction of FIG. 1) in the middle in the vehicle width direction (i.e., the vertical direction of FIG. 1) of the floor panel 7. The rockers 8R, 8L extending in the vehicle length direction are located along side edges 7R, 7L in the vehicle width direction of the floor panel 7. The rockers 8R, 8L are frame members with a closed cross section. The rockers 8R, 8L protect the cabin, battery 10, etc. of the vehicle 100 when the vehicle 100 is involved in a collision (e.g., head-on collision or side collision).

The right torque box 6R is located at a front end 18R of the right rocker 8R. The right torque box 6R extends inward (i.e., upward in FIG. 1) from the front end 18R of the right rocker 8R along a front edge 7F in the vehicle length direction of the floor panel 7. Similarly, the left torque box 6L is located at a front end 18L of the left rocker 8L. The torque boxes 6R, 6L are joined, on their inner sides, to the center tunnel 9 of the floor panel 7. The torque boxes 6R, 6L are symmetrical in shape with each other. Regarding the torque boxes 6R, 6L, the right torque box 6R will be mainly described in the present specification. However, the left torque box 6L has the same shape as the right torque box 6R.

The right front side member 4R is joined to the right torque box 6R. The right front side member 4R extends forward from the right torque box 6R. A proximal end portion 40R of the right front side member 4R is joined to the inner surface of the right torque box 6R. Similarly, a proximal end portion 40L of the left front side member 4L is joined to the inner surface of the left torque box 6L.

Detailed structures of the right torque box 6R and the right front side member 4R will be described with reference to FIG. 2. The right torque box 6R is a sheet metal part shaped to have an open top (i.e., shaped to be open toward the side farther away from the viewer of FIG. 2). The right torque box 6R has an inner front wall 61R, an outer front wall 62R, a rear wall 64R, and a bottom wall 66R. The front walls 61R, 62R face the rear wall 64R in the vehicle length direction. The bottom wall 66R extends in the vehicle length direction and connects the front walls 61R, 62R with the rear wall 64R. The right torque box 6R thus forms an internal space S1 in front of the floor panel 7 (see FIG. 1). The internal space S1 is a space extending in the vehicle width direction along the right torque box 6R. The right torque box 6R thus has a closed cross section by the walls 61R, 62R, 64R, and 66R. The right torque box 6R therefore has high rigidity. The right torque box 6R having high rigidity can firmly connect the right rocker 8R (see FIG. 1) and the right front side member 4R.

Figure 2:
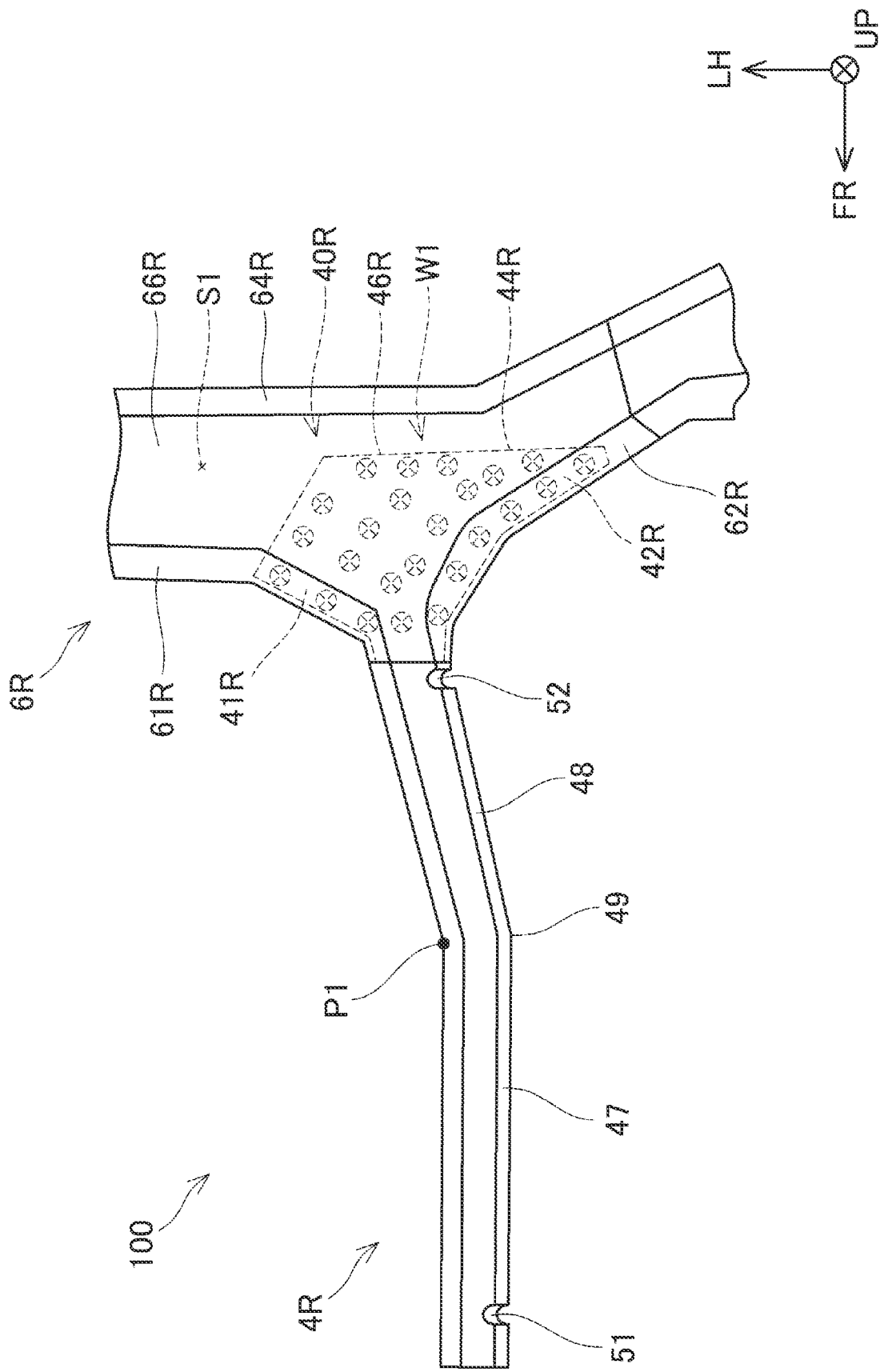
FIG. 2 is an enlarged view of a right front side member.

The right front side member 4R is a sheet metal part shaped to have an open top (i.e., shaped to be open toward the side farther away from the viewer of FIG. 2). The right front side member 4R has a front portion 47, a rear portion 48, a bend 49, and the proximal end portion 40R. As shown in FIG. 1, a front end of the right front side member 4R is connected to the bumper reinforcement 2.

The front portion 47 of the right front side member 4R extends in the vehicle length direction. The rear portion 48 of the right front side member 4R is tilted inward toward the rear. The bend 49 therefore protrudes outward. As a result, the right front side member 4R has a bending point P1 on the inner side of the bend 49.

The right front side member 4R has a front side groove 51 on the outer side surface (i.e., the lower surface in FIG. 1) of a front end portion of the front portion 47. The front side groove 51 extends in the vehicle height direction (i.e., the direction perpendicular to the plane of paper of FIG. 1). The front side groove 51 is recessed inward. Similarly, the right front side member 4R has a rear side groove 52 on the outer side surface of a rear end portion of the rear portion 48. The rear side groove 52 is recessed inward. The rear side groove 52 also extends in the vehicle height direction.

The proximal end portion 40R of the right front side member 4R is located in the internal space S1 of the right torque box 6R. The proximal end portion 40R includes a rear end 44R of the right front side member 4R. The proximal end portion 40R has an inner side wall 41R, an outer side wall 42R, and a bottom wall 46R. The inner side wall 41R of the proximal end portion 40R extends along part of the inner front wall 61R of the right torque box 6R. The outer side wall 42R of the proximal end portion 40R extends along part of the outer front wall 62R of the right torque box 6R. The bottom wall 46R of the proximal end portion 40R extends along part of the bottom wall 66R of the right torque box 6R. That is, the proximal end portion 40R is formed so as to conform to the inner surface of the right torque box 6R.

As shown in FIG. 2, the proximal end portion 40R of the right front side member 4R is welded to the inner surfaces (i.e., the surfaces on the side farther away from the viewer of FIG. 2) of the walls 61R, 62R, and 66R of the right torque box 6R at a plurality of welding points W1. At this time, the inner side wall 41R of the proximal end portion 40R is welded to part of the inner front wall 61R of the right torque box 6R, the outer side wall 42R of the proximal end portion 40R is welded to part of the outer front wall 62R of the right torque box 6R, and the bottom wall 46R of the proximal end portion 40R is welded to part of the bottom wall 66R of the right torque box 6R. The proximal end portion 40R of the right front side member 4R is thus firmly joined to the inner surfaces of the walls 61R, 62R, and 66R of the right torque box 6R. As a result, the right front side member 4R and the right torque box 6R are firmly connected to each other.

The inner side wall 41R of the proximal end portion 40R of the right front side member 4R has such a fillet shape as to widen inward (i.e., upward in FIG. 2) toward the rear end 44R. Similarly, the outer side wall 42R of the proximal end portion 40R of the right front side member 4R has such a fillet shape as to widen outward (i.e., downward in FIG. 2) toward the rear end 44R. The fillet shape of the outer side wall 42R is different from the fillet shape of the inner side wall 41R in that, as shown in FIG. 2, the fillet shape of the outer side wall 42R widens more than the fillet shape of the inner side wall 41R.

Deformation of the right front side member 4R when the vehicle 100 is involved in a head-on collision will be described with reference to FIG. 3. When the vehicle 100 is involved in a head-on collision, a first collision load F1 is transmitted to the right front side member 4R via the bumper reinforcement 2. As described above, the proximal end portion 40R of the right front side member 4R is firmly connected to the inner surface of the right torque box 6R in the internal space S1 of the right torque box 6R. Therefore, even when the first collision load F1 is transmitted to the right front side member 4R, separation will not occur at the connection between the proximal end portion 40R of the right front side member 4R and the right torque box 6R. As a result, as shown in FIG. 3, the right front side member 4R is sufficiently bent (i.e., deformed) in an intended manner by the first collision load F1 such that the bend 49 is displaced outward.

The energy generated by the first collision load F1 is thus sufficiently absorbed by the deformation of the right front side member 4R. As a result, a second collision load F2 smaller than the first collision load F1 is transmitted to the right torque box 6R. The right torque box 6R transmits the second collision load F2 to the right rocker 8R (see FIG. 1). The vehicle 100 can thus protect the battery 10 (see FIG. 1) in case of a head-on collision.

Since the proximal end portion 40R of the right front side member 4R is located in the internal space 51 of the right torque box 6R, the space in the vehicle length direction for housing the proximal end portion 40R can be reduced. Therefore, the structure between the right front side member 4R and the right rocker 8R can be reduced in size as compared to, for example, a configuration in which the right front side member 4R and the right torque box 6R are connected in the vehicle length direction by a separate member. As a result, for example, the space in the vehicle length direction for housing the battery 10 can be increased.

Moreover, since the right front side member 4R is stably bent as shown in FIG. 3, the vehicle 100 of the present embodiment need not include, for example, a separate member that connects the front end of the right front side member 4R and the front end of the left front side member 4L. Since the mass, space, etc. for the separate member are not required, the mass, space, etc. can be reduced.

Moreover, the front portion 47 of the right front side member 4R is bent at the front side groove 51 so as to protrude inward. Similarly, the rear portion 48 of the right front side member 4R is bent at the rear side groove 52 so as to protrude inward. As described above, forming the grooves 51, 52 at at least one position in the vehicle length direction of the right front side member 4R allows the right front side member 4R to be sufficiently deformed in an intended manner at the grooves 51, 52.

The right front side member 4R is also bent significantly at the bending point P1 on the inner side of the bend 49 so as to protrude outward. As described above, forming the outwardly protruding bend 49 at at least one position in the vehicle length direction of the right front side member 4R allows the right front side member 4R to be stably deformed at the bend 49. Since the bend 49 of the right front side member 4R protrudes outward, the bend 49 is displaced outward. Accordingly, in the case where, for example, an electrical device etc. is located inside the right front side member 4R, the bend 49 can be prevented from interfering with the electrical device etc. when displaced.

As described above, the fillet shape of the outer side wall 42R of the proximal end portion 40R of the right front side member 4R widens more than the fillet shape of the inner side wall 41R of the proximal end portion 40R of the right front side member 4R. Therefore, the outer side wall 42R of the proximal end portion 40R is more firmly fixed to the inner surface of the right torque box 6R than the inner side wall 41R of the proximal end portion 40R. The right front side member 4R can therefore be sufficiently deformed in an intended manner at the rear side groove 52.

Although the specific example of the present disclosure is described in detail above, this is merely illustrative and is not intended to limit the scope of the claims. The technique described in the claims includes various modifications and alterations of the specific example illustrated above. Modifications of the above embodiment will be described below.

First Modification

The right front side member 4R may have either the front side groove 51 or the rear side groove 52. In another modification, the right front side member 4R may not have any grooves. In still another modification, the right front side member 4R may have a groove on its inner side surface.

Second Modification

The rear portion 48 of the right front side member 4R may not be tilted inward toward the rear. In this case, the right front side member 4R may have an outwardly protruding bend 49 between the front and rear portions 47, 48 extending in the vehicle length direction. In another modification, the right front side member 4R may have bends 49 at a plurality of positions in the vehicle length direction.

Third Modification

The fillet shape of the outer side wall 42R of the proximal end portion 40R need not necessarily widen more than the fillet shape of the inner side wall 41R of the proximal end portion 40R. The fillet shape of the proximal end portion 40R may be changed according to the shape to which the right front side member 4R is intended to be deformed.

The technical elements illustrated in the present specification or the drawings exhibit technical utility alone or in various combinations, and are not limited to the combinations set forth in the claims as originally filed. The technique illustrated in the present specification or the drawings may achieve a plurality of objects at the same time, and has technical utility by achieving one of the objects.

What is claimed is:

1. A vehicle comprising:
  a floor panel;
  a battery located under the floor panel;
  a rocker extending in a vehicle length direction along a side edge of the floor panel, the side edge being an edge of the floor panel in a vehicle width direction;
  a torque box extending inward in the vehicle width direction from a front end of the rocker along a front edge of the floor panel, the torque box including a front wall and a rear wall that face each other in the vehicle length direction, the front edge being an edge of the floor panel in the vehicle length direction, and the front wall and the rear wall defining an internal space extending in the vehicle width direction; and
  a front side member extending forward in the vehicle length direction from the torque box, and including a proximal end portion at a rear end of the front side member, the proximal end portion being located in the internal space of the torque box, and being joined to an inner surface of the torque box in the internal space,
  wherein the front side member includes a bend at at least one position in the vehicle length direction, the bend protruding outward in the vehicle width direction,
  wherein the front side member has grooves at at least a first position and a second position in the vehicle length direction, the grooves extending in a vehicle height direction, and
  wherein the first position is located forward of the bend in the vehicle length direction, and the second position is located rearward of the bend in the vehicle length direction.

2. The vehicle according to claim 1, wherein:
  the proximal end portion of the front side member has such a fillet shape as to widen in the vehicle width direction toward the rear end; and
  the fillet shape widens more in an outer portion in the vehicle width direction of the fillet shape than in an inner portion in the vehicle width direction of the fillet shape.

* * * * *